(12) United States Patent
Zhu et al.

(10) Patent No.: US 9,760,427 B2
(45) Date of Patent: Sep. 12, 2017

(54) METHOD AND APPARATUS FOR IDENTIFYING LOCATION RELATED HARDWARE FAILURES

(71) Applicant: CISCO TECHNOLOGY, INC., San Jose, CA (US)

(72) Inventors: Min Zhu, Shanghai (CN); Jingming Li, Guangdong (CN)

(73) Assignees: Cisco Technology, Inc.; Cindy Kaplan

( * ) Notice: Subject to any disclaimer, the term of this patent is extended or adjusted under 35 U.S.C. 154(b) by 78 days.

(21) Appl. No.: 14/850,670

(22) Filed: Sep. 10, 2015

(65) Prior Publication Data

US 2017/0075743 A1 Mar. 16, 2017

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0769* (2013.01); *G06F 11/0772* (2013.01)

(58) Field of Classification Search
CPC ............. G06F 11/0751; G06F 11/0769; G06F 11/0772; G06F 11/079
See application file for complete search history.

(56) References Cited

U.S. PATENT DOCUMENTS

| | | | |
|---|---|---|---|
| 6,129,449 A * | 10/2000 | McCain | G05B 19/4063 345/173 |
| 7,493,525 B2 | 2/2009 | Wigley et al. | |
| 8,560,903 B2 | 10/2013 | Wang et al. | |
| 9,575,862 B1 * | 2/2017 | Hutton | G06F 11/3031 |
| 2002/0198983 A1 | 12/2002 | Ullmann | G06F 11/0709 709/224 |
| 2004/0068561 A1* | 4/2004 | Yamamoto | G06F 3/0605 709/224 |
| 2008/0141076 A1* | 6/2008 | Hu | G06F 11/0733 714/45 |
| 2011/0035496 A1 | 2/2011 | Shively | |
| 2012/0226943 A1* | 9/2012 | Alderman | G06F 11/0751 714/37 |
| 2013/0036322 A1 | 2/2013 | Bauer et al. | |
| 2013/0226393 A1* | 8/2013 | Julson | G07C 5/0808 701/29.6 |
| 2014/0195844 A1* | 7/2014 | Laval | G06F 11/3062 713/340 |
| 2015/0253241 A1* | 9/2015 | Kaneoka | G01R 31/311 356/237.5 |
| 2016/0342451 A1* | 11/2016 | Ly | G06F 11/0769 |
| 2017/0039105 A1* | 2/2017 | Shivanna | G06Q 50/00 |

* cited by examiner

*Primary Examiner* — Joshua P Lottich
(74) *Attorney, Agent, or Firm* — Cindy Kaplan

(57) ABSTRACT

In one embodiment, a method includes receiving at a location related failure identification device, failure data for a plurality of components within a system, mapping at the device, the failure data to location data comprising a location of each of the components within the system, identifying at the device, location related failures based on the mapping, and outputting from the device, information on the location related failures. An apparatus and logic are also disclosed herein.

20 Claims, 8 Drawing Sheets

METHOD AND APPARATUS FOR IDENTIFYING LOCATION RELATED HARDWARE FAILURES

TECHNICAL FIELD

The present disclosure relates generally to hardware, and more specifically, to identifying location related hardware failures.

BACKGROUND

Applications such as telecommunications, transportation, aerospace, and medical use a large number of individual electronic components. Electronic components often fail due to excessive temperature or mechanical shock or stress. For example, thermal expansion may produce mechanical stresses that may cause material fatigue. High temperatures may also cause cracking as well as mechanical damage or shock. These types of failures may impact a number of components located proximate to one another.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
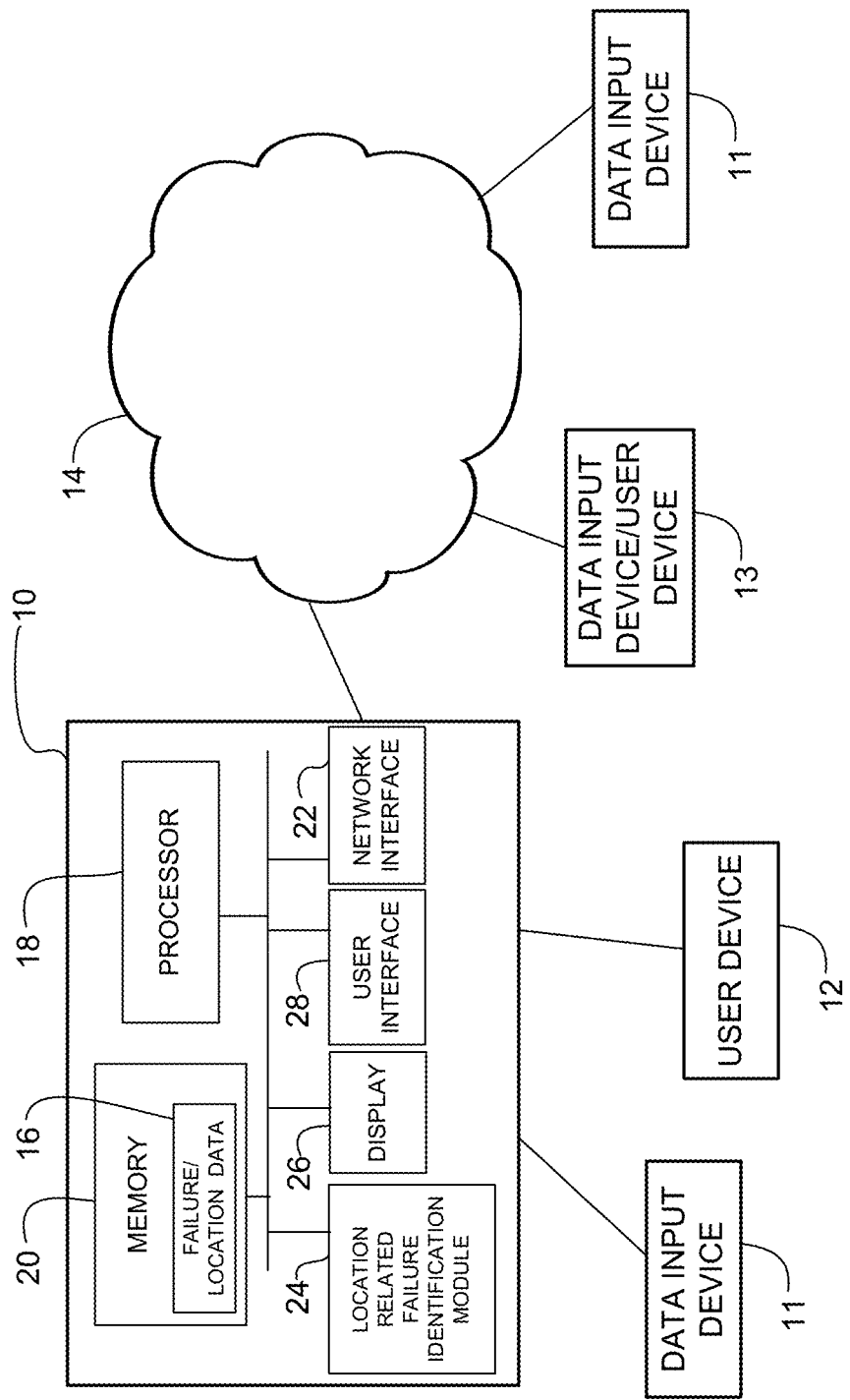
FIG. 1 illustrates an example of a network in which embodiments described herein may be implemented.

In one embodiment, a method generally comprises receiving at a location related failure identification device, failure data for a plurality of components within a system, mapping at the device, the failure data to location data comprising a location of each of the components within the system, identifying at the device, location related failures based on the mapping, and outputting from the device, information on the location related failures.

In another embodiment, an apparatus generally comprises a database comprising failure data for a plurality of components within a system and a location of each of the components within the system, and a processor when operating at the apparatus operable to map the failure data to the component locations, identify location related failures based on the mapping, and output information on the location related failures.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Many types of failure mechanisms (e.g., stress, impact, mechanical shock, excessive temperature or number of temperature cycles, excessive current or voltage, etc.) may cause failures on different types of electronic components that are mounted or positioned in proximate locations. Location related failures may include, for example, failures due to mechanical stress (e.g., near mounting hole or board edge), soldering issues (e.g., intermittent failures), thermal (e.g., component life cycle), software bug (e.g., device driver, SerDes (Serializer/Deserializer) setting margin), or any other type of failure associated with an operating location of a component or impacting a plurality of components mounted or installed in the same general location. External mechanical stress or thermal stress, for example, may cause failure of components on a circuit board in a specific location, however, if the components differ in type, tracking a failure by component type would not provide any insight as to a location related failure. Thus, with conventional tracking of component failures, there is no way to quickly review and diagnose a location related failure.

The embodiments described herein provide for identification of location related failures through visualization of failure data mapped onto an image or automatic detection of location related failures based on mapping of failure data to component locations. One or more embodiments may, for example, display failure data as an overlay on a graphical image of components in their operating location. Certain embodiments may associate failure data with location data to automatically identify location related failures and notify one or more users so that the problem may be resolved (e.g., layout change, packaging change, structural or thermal modifications, or any other redesign). The embodiments allow location related failures to be easily distinguished from component quality issues and accurately identified in an early stage of manufacturing or any other point in the product life cycle, to improve product quality and customer satisfaction.

Referring now to the drawings, and first to FIG. 1, a network in which embodiments described herein may be implemented is shown. In the example shown in FIG. 1, a location related failure identification device (e.g., network device, computer, computing device) 10 collects failure data, analyzes the data, and presents a graphical output or notification identifying location related failures. The device 10 may receive failure data or design data from one or more input devices 11, which may be in direct communication with the device 10 or in communication with the device 10 over one or more networks 14 (e.g., local area network (LAN), metropolitan area network (MAN), wide area network (WAN), virtual private network (VPN), virtual local area network (VLAN), wireless network, enterprise network, Internet, intranet, radio access network, public switched network, or any other network). The failure data may be viewed directly at device 10 or on one or more user devices 12 in direct communication with the device or in communication over network 14. There may also be one or more devices 13 configured to input data and view location related failure data. The location related failure identification device 10, data input device 11, user device 12, or data input/user device 13 may comprise, for example, a management station, personal computer (e.g., desktop computer), cellular phone, tablet, laptop, personal digital assistant, portable computing device, multimedia device, and the like. It is to be understood that the device 10 may receive data and output data to any number of devices 11, 12, 13 either directly or over one or more networks 14. Also, data may be input directly into the location related failure identification device 10 and displayed on the device in which case there would be no need for the device to communicate with network 14 or other devices 11, 12, 13.

As described in detail below, the device 10 receives failure data for a plurality of components within a system and stores the failure data in a database comprising a location of each of the components within the system. The term "component" or "electronic component" as used herein may refer to any component or subsystem (group of components) and may comprise an active component (e.g., chip, resistor, capacitor) or a static component (e.g., connector, wire, pad, or other hardware component used in the system). For example, the electronic component may be a chip, assembly comprising a plurality of chips, circuit board, plurality of circuit boards, or any other component. The term "system" as used herein may refer to any installation or assembly level in which the components operate. For example, the system may comprise a circuit board, computer system, or any other subsystem or group of components in which individual locations may be identified for each of the electronic components. The location related failure identification device 10 may be any type of device (e.g., computer, processor, network appliance, or other suitable device, component, element, or object capable of performing operations described herein) or group of devices configured to receive, process, and store failure data and design data and generate location related failure data (e.g., image with failure data overlay, notification of location related failure, identification of high risk location). The device 10 may also include remotely located devices (e.g., storage for the device).

The device 10 may be in communication with a central collection device in communication with a plurality of data collection devices 11 located throughout the network 14 or a building (e.g., factory, test facility, repair facility), or in direct communication with one or more input devices 11. The failure data may be input, for example, directly from a test device operable to test units at any point in a manufacturing process (e.g., circuit board level, top assembly level, computer system level) or the data may be collected or sorted (e.g., automatically or manually) before being input at the device 10. The failure data may also include input from a repair facility or customer center, an operating system (OS) error message pointing to a defective component, or any other data identifying failures after the system has been in operation.

One or more of the data input devices 11 may also provide mechanical design data identifying locations of the electronic components in an intermediate level assembly, top level assembly, or any other installation level. The location (design) data may include, for example, the location of individual electronic components (e.g., chips, capacitors, resistors) within a system (e.g., on a circuit board or sub-system within a computer system). The component location may be identified by a zone, area, region, (x, y)/(x, y, z) location, or any other identifier indicating a specific or general installation (operating) location of the component.

Failure data may be provided for individual components at a low level (e.g., chip level), at an intermediate level (e.g., side or layer of multi-layer printed circuit board), at a high level (e.g., circuit board), or any other level or combination thereof. The location data is similarly provided at one or more assembly levels. For example, the mechanical data may identify chip locations on a circuit board or may identify circuit board location in a computer system comprising a plurality of circuit boards.

In one embodiment, the location related failure identification device 10 is a programmable machine that may be implemented in hardware, software, or any combination thereof. The device 10 includes one or more processor 18 and memory 20, and may include one or more network interface 22. In the example shown in FIG. 1, the device 10 also includes a location related failure identification module 24, display 26, and a user interface 28 (e.g., graphical user interface (GUI)). The display 26 and GUI 28 may also be located at the user device 12, 13 for use in displaying failure visualization images and interfacing with the location related failure identification system.

Memory 20 may be a volatile memory or non-volatile storage, which stores various applications, operating systems, modules, and data for execution and use by the processor 18. Component failure and location data 16 may be stored in memory 20 using one or more data structures (e.g., database, table). For example, memory may store design data (e.g., computer layout, circuit board layout, and the like) identifying component locations and one or more tables mapping failure data to component locations.

Logic may be encoded in one or more tangible media for execution by the processor 18. For example, the processor 18 may execute codes stored in a computer-readable medium such as memory 20. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The device 10 may include any number of processors 18.

The network interface 22 may comprise one or more interfaces (linecards, ports) for receiving signals or data or transmitting signals or data to other devices. The interface 22 may include, for example, an Ethernet interface or wireless interface for connection to a computer or network. The network interface 22 may be configured to transmit or receive data using a variety of different communication protocols. The interface 22 may include mechanical, electrical, and signaling circuitry for communicating data over physical links coupled to the device 10.

The display 26 may comprise any type of display screen (e.g., LCD (liquid crystal display) screen, LED (light emitting diode) screen, plasma display, projected image screen, electronic ink, or any other suitable display screen.

The user interface 28 may comprise any type of interface configured to receive input from a user indicating what type of component or system failure to display (e.g., filter to indicate system/component level to display). The user interface 28 may comprise, for example, a touchscreen displaying a graphical user interface for displaying a selectable image and receiving input from the user. The user interface 28 may also include input devices (e.g., button or other mechanism, mouse, microphone, etc.) for receiving user input. For example, the user interface 28 may include a keyboard (e.g., touchscreen or keys) for use in entering criteria for displaying location related failure data (e.g., filters).

As described in detail below with respect to FIG. 2, the location related failure identification module 24 (e.g., visualization engine, location related failure mining engine) is operable to map component failures to locations and generate a visual location related failure image or notification of a location related failure. The module 24 may include software, code, or any other mechanism configured to perform processes described herein.

It is to be understood that the device 10 shown in FIG. 1 and described above is only an example and that different configurations of devices or network topologies may be used without departing from the scope of the embodiments. For example, the device 10 may further include any suitable combination of hardware, software, algorithms, processors, devices, components, or elements operable to facilitate the capabilities described herein. Also, the location related failure identification system described herein may be located at a standalone device 10 that receives failure data input from means other than a network interface (e.g., removable memory). Thus, the device 10 does not need to be connected to a network. Also, elements of the location related failure identification system may be located at one or more devices or computer systems.

Figure 2:
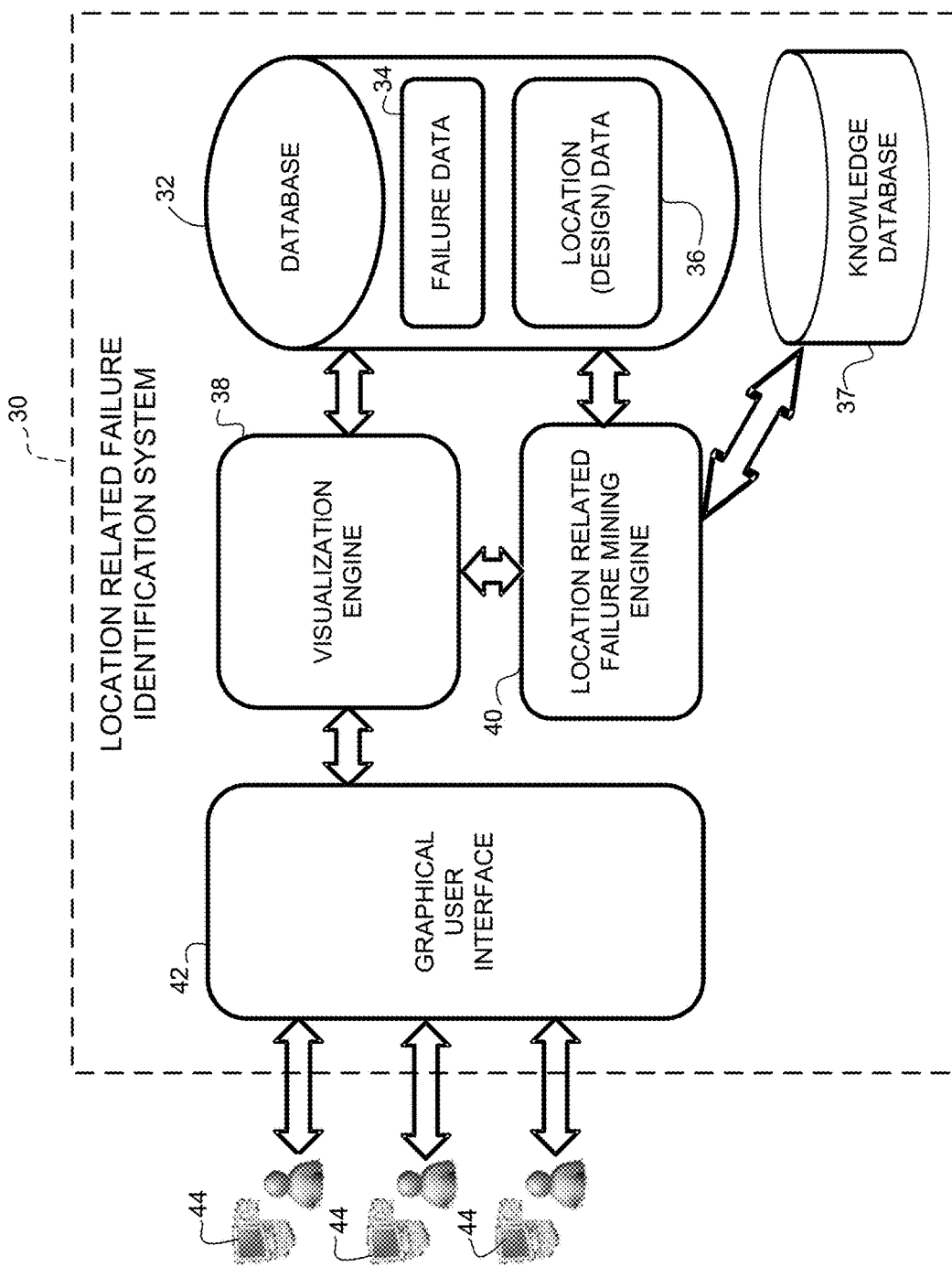
FIG. 2 depicts components of a location related failure identification system, in accordance with one embodiment.

FIG. 2 illustrates an example of a location related failure identification system 30, in accordance with one embodiment. One or more components of the system 30 may be located at the device 10 shown in FIG. 1. The system 30 includes a database 32 for collecting failure data 34 and location (hardware design) data 36. The failure data 34 may include, for example, failures identified on field returned units, manufacturing test units, or any combination of these or other reported or tracked failures. The database 32 may comprise one or more databases for storing the failure data 34, location data 36, or both the failure data and location data. In one embodiment, the system automatically maps the failure data 34 to its location based on design data 36. The mapping is provided to a visualization engine 38 operable to generate a visual image illustrating the location of failures on a system diagram, as described in detail below. The visualization engine 38 may, for example, fetch failure data 34 from database 32 and automatically map the failure data to a system image generated based on design data 36.

The system 30 shown in the example of FIG. 2 further includes a location related failure mining engine 40 operable to process the data 34, 36 and generate a notification of a location related failure or highlight a high risk location based on the mapping of the failure data 34 to the location data 36. The mining engine 40 may, for example, automatically identify a high risk location based on a location related issue knowledge database 37 or set an alarm if failures exceed a specified threshold in one or more locations (e.g., defined zone or region (e.g., within an area less than a specified diameter or length/width) or near an edge margin or hole (e.g., within a specified distance from an edge of a circuit board or a mounting hole)). The alarm may comprise, for example, an automatically generated message (email, text, automated voice message, etc.) sent to one or more users (e.g., quality control, engineer, business unit contact). An engineer may then identify the root cause of the location related failure (e.g., mechanical stress, thermal, soldering, software issue, etc.) and take action to resolve the issue (e.g., redesign the component or layout). A high risk area may be identified based on the number of failures in a location. For example, if a high number of component failures are mapped to a general location (e.g., zone, region, area), the location may be identified as high risk and highlighted on a visual image or indicated in a notification message as a possible redesign candidate.

The system 30 further includes an interactive graphical user interface 42. In certain embodiments, the graphical user interface 42 is a three-dimensional (3D) graphical user interface, which may communicate with any number of users 44 for receiving input (e.g., component to display, filtering of data, type of display (e.g., mechanical, thermal)) and providing output (visualization image, notification) to assist the user in identifying location related issues. The GUI may include an interactive explorer to allow a user to manipulate the image (e.g., zoom, rotate about an axis, tilt, pan, etc.) to identify a high risk location.

It is to be understood that the system shown in FIG. 2 and described above is only an example and that other components, engines, databases, or interfaces may be included, without departing from the scope of the embodiments.

Figure 3:
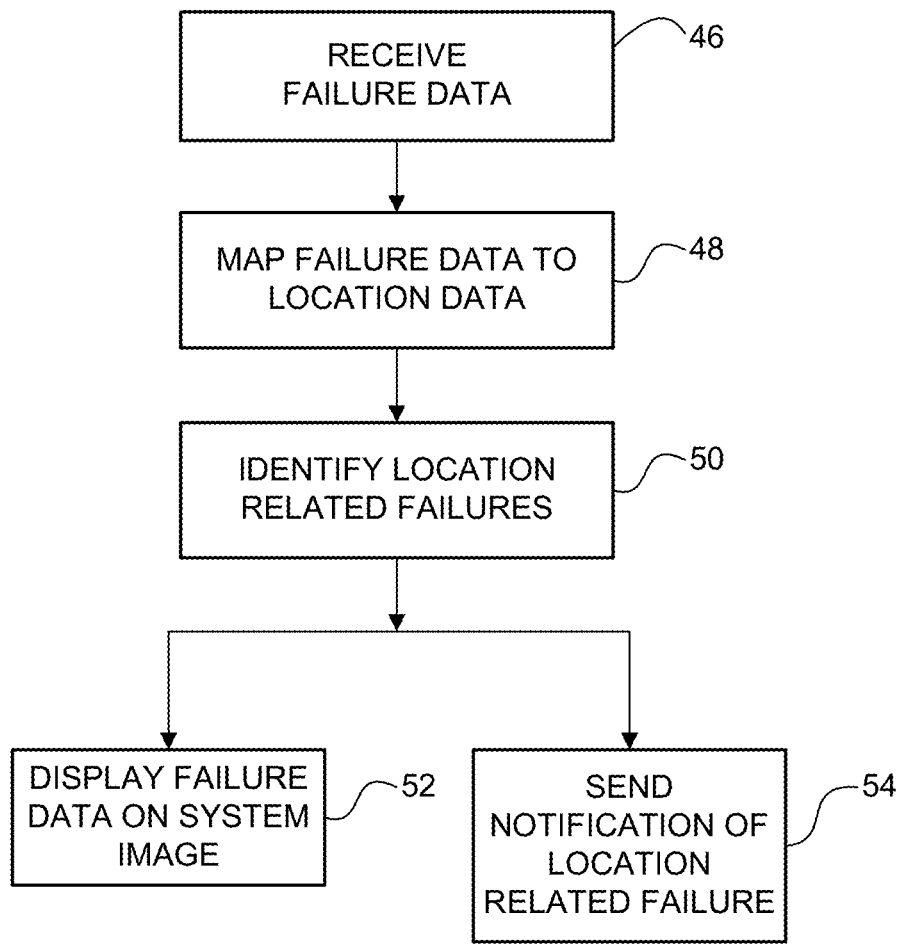
FIG. 3 illustrates an overview of a process for identifying location related failures, in accordance with one embodiment.

FIG. 3 is a flowchart illustrating an overview of a process for identifying location related failures, in accordance with one embodiment. At step 46, a location related failure identification device (e.g., device 10 in FIG. 1) receives failure data from one or more sources for a plurality of components within a system. The failure data is stored in a database (e.g., database 32 in FIG. 2) comprising a location of each of the components within the system (location data). The failure data may be collected and stored at the device 10 and periodically updated. As previously described, the failure data may be provided for components at any level (e.g., individual components, group of components, etc.) and the system may be any type of assembly level comprising a plurality of components. The failure data is mapped to the location data (step 48). The mapping comprises associating an identified failure of a component with a location of that component within the system. The device 10 identifies location related failures based on the mapping (step 50) and outputs information on the location related failures. Identifying location related failures may comprise generating an image displaying location related failures, generating a notification of a location related failure, or identifying a high risk location, for example.

Figure 4:
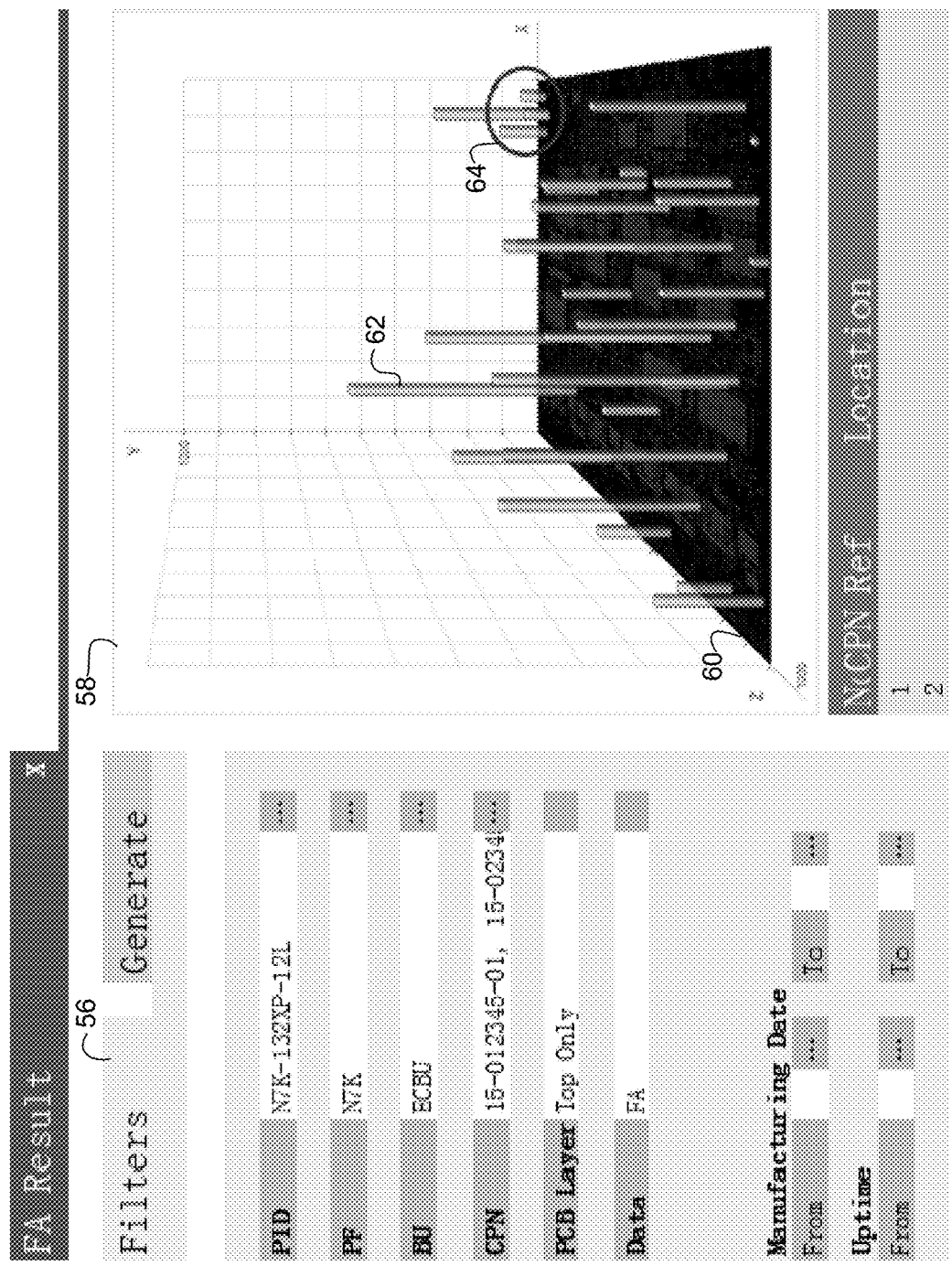
FIG. 4 is an example of a graphical user interface for use in requesting and displaying location related failure data.

In one embodiment, the device 10 generates an image comprising a layout of the components with the failure data shown on the layout (step 52). In one example, a bar graph is superimposed on an electronic component assembly layout as shown in FIGS. 4 and 6. In one embodiment, an automatic notification of a location related failure is generated to alert one or more users of a location related issue (step 54). For example, a location related failure (e.g., high risk location) may be identified if failures are reported for a specified number of components within a defined area. Only one of the steps 52, 54 may be performed or both steps may be performed, depending on system or user configuration.

It is to be understood that the process shown in FIG. 3 and described above, is only an example and that steps may be added, deleted, combined, or modified without departing from the scope of the embodiments. Also, it may be noted that the processor 18 or the location related failure identification module 24 shown in FIG. 1 (or a combination thereof) may implement one or more of the steps shown in FIG. 3 and described herein. For example, logic encoded on a computer readable media and executed by the processor 18 may be operable to perform one or more steps shown in FIG. 3 and described above.

FIG. 4 illustrates an example of a graphical user interface displaying location related failure data, in accordance with one embodiment. A user may first log into the system 30 remotely in order to view the location related failure data. For example, a user may log into the system at user device 12, 13 shown in FIG. 1. The user may enter a user identification (ID) and password (or any other credentials), for example. The user may select a system (e.g., circuit board, assembly or computer layout, etc.). In the example shown in FIG. 4, a part identifier (PID) is entered (or selected). The part identifier may be, for example, a circuit board or other assembly comprising a plurality of individual components assembled into their operating location. The next item indicates the top level part number into which the completed assembly is used (e.g., router, switch, server, appliance, computer, gateway, access point, controller, access device, aggregation device, host, or any other top level system or device). In the example shown in FIG. 4, a business unit (BU) associated with the part is displayed along with a company part number (e.g., Cisco part number (CPN)). In this example, a PCB (Printed Circuit Board) layer is shown (top only) with data FA (failure analysis). The manufacture date and uptime may also be selected or shown. A user may, for example, select the manufacturing date range or system uptime range as a filter. This allows the user to check a failure specified in one manufacture date range and the correlation between failures and manufacture date/uptime. The user may select the type of failure data they want to view. The failure data may include, for example, manufacture repair history, diagnostic test failure record, or OBFL (On Board Failure Logging).

In the example shown in FIG. 4, the system receives a request from the user and outputs a three dimensional view (image 58) of failure data 62 mapped to the component location on the physical board 60. In this example, the circuit board 60 is shown in an (x, z) plane and failure data is displayed in a bar graph 62 extending along a y-axis and positioned relative to the actual location of the failed component on the circuit board. The number of failures for each component is indicated by the height of each bar 62 along the y-axis.

The user can then easily identify any location related issues upon viewing the image 58. For example, if the image depicts abnormal failure data in one specific area, such as area 64 shown in FIG. 4, a location related failure may be identified. In certain embodiments, the user interface is interactive and may allow the user to zoom in, zoom out, or rotate the image to get a clear view of a location containing a high number of failures (e.g., location 64 in FIG. 4). The mining engine 40 (FIG. 2) may be used to highlight one or more high risk locations based on the location related issue knowledge database 37.

In one example, a capacitor short may be identified on a number of returned units and manufacturing tests. When the failures are shown mapped on the circuit board as shown in FIG. 4, it may be seen that all of the capacitors are positioned close to the same mounting hole. After viewing the location related failures, an engineer may further investigate the problem to identify mechanical stress as the root cause of the failures.

The graphical user interface may comprise any number or type of filters 56 so that the user can specify the data that they would like to view. For example, the user may add a filter to narrow the failure data source and check the influence of different factors to the location related failure. In one example, the user may filter the failure data to check boards shipped in a specific manufacture date range.

Figure 5:
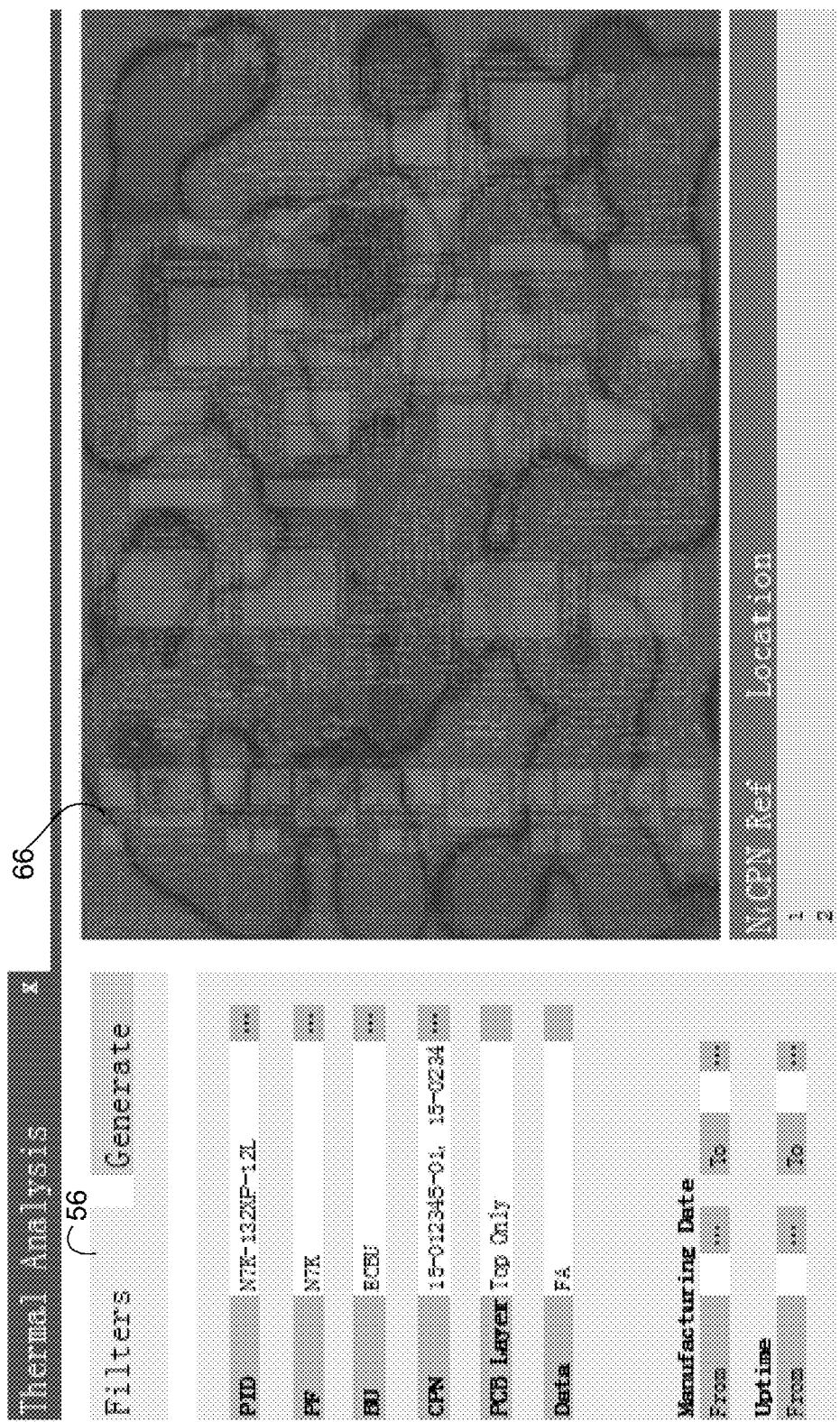
FIG. 5 is another example of the graphical user interface of FIG. 4 displaying thermal characteristics.
Figure 6A:
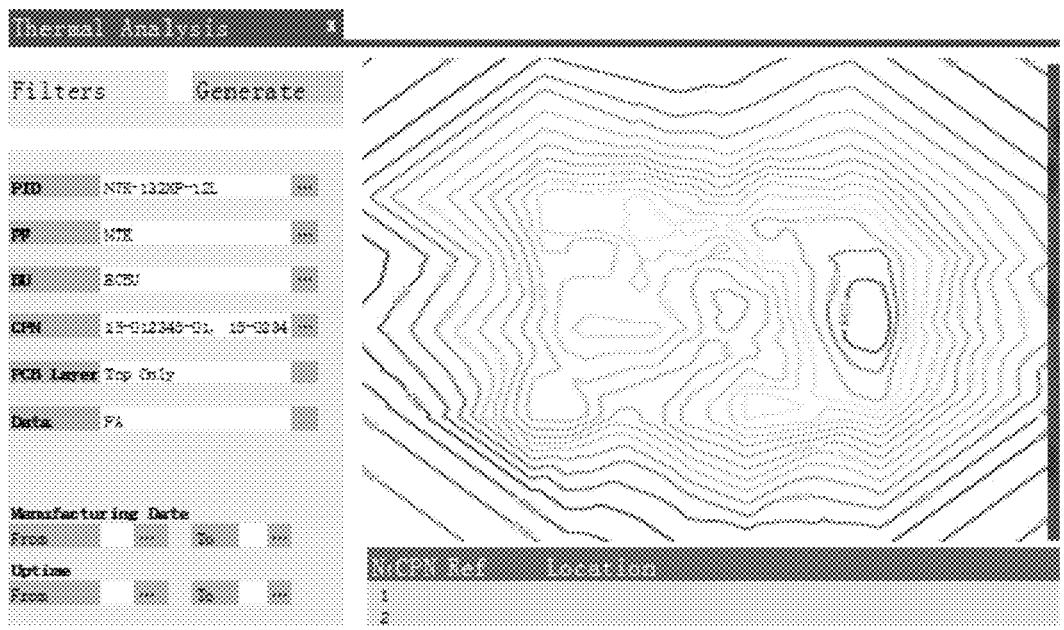
FIG. 6A illustrates an example of a two dimensional thermal graph that may be used to display thermal characteristics.
Figure 6B:
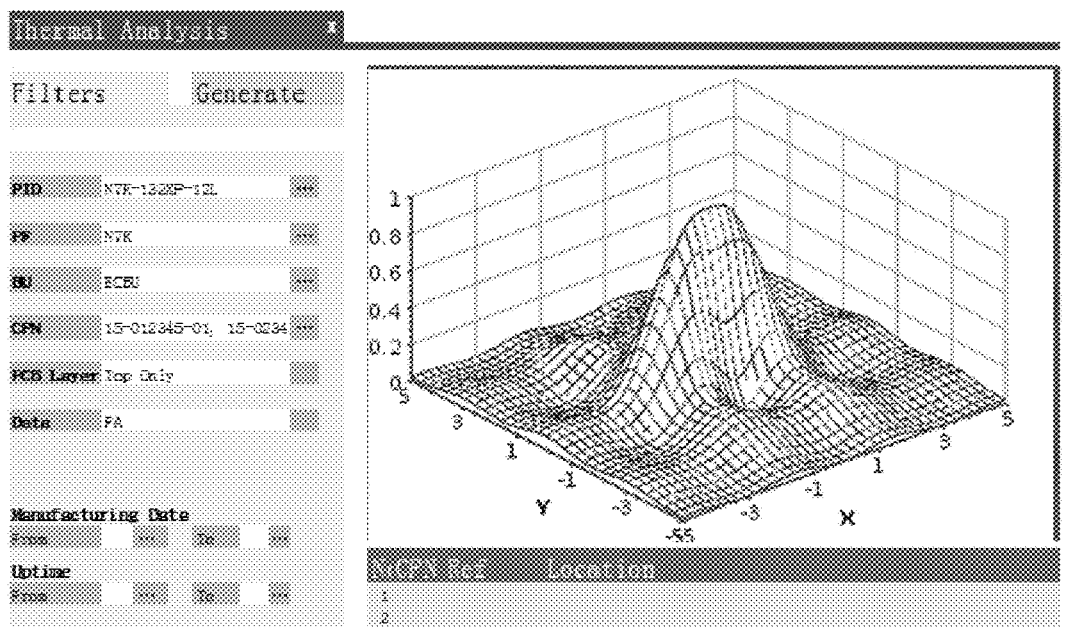
FIG. 6B illustrates an example of a three dimensional thermal graph that may be used to display thermal characteristics.

FIG. 5 illustrates a thermal overlay 66 on the circuit board 60 shown in FIG. 4. This image may be used to identify a failure that may be due to excessive heat in one or more locations. Different operating temperatures may be identified by different colors. Correlation analysis between component life cycle and field environment temperature may be used to identify problem areas. Thermal performance analysis may be performed across different modules and different boards. The thermal information may come from an operating system message, OBFL, SMT (Surface Mount Technology) soldering temperature profile, or any other source. The thermal image (thermal overlay) 66 shown in FIG. 5 may also include a failure data overlay. The thermal overlay may also be in the format of a two-dimensional contour graph, as shown in FIG. 6A, or a three dimensional surface graph, as shown in FIG. 6B, for example.

Figure 7:
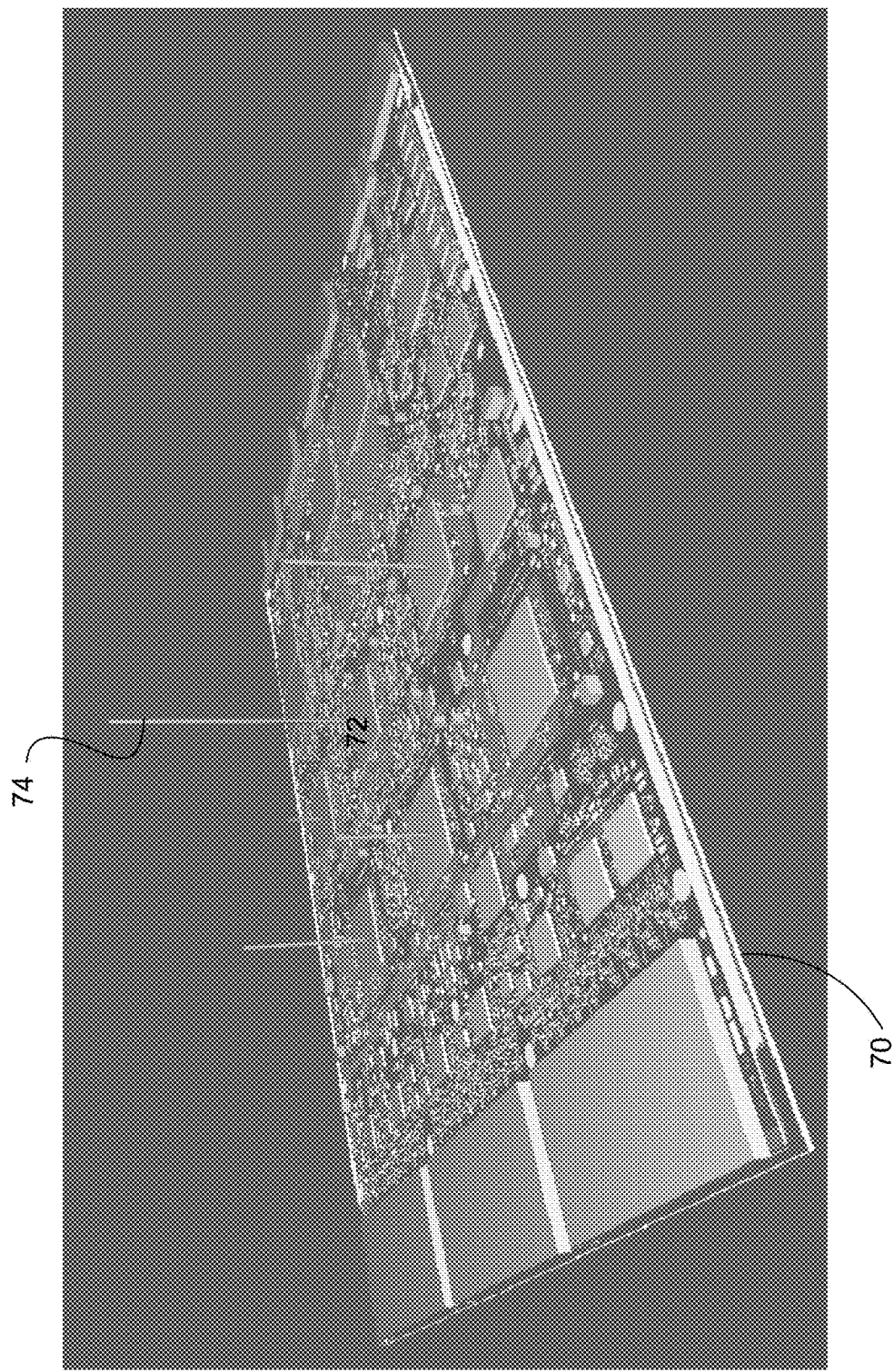
FIG. 7 is an example of a three dimensional image showing a mapping of component failures on a circuit board.

FIG. 7 illustrates an example of failure data 74 for electrical components 72 mapped to a three dimensional view of a system 70 (circuit board). The bar 74 indicates the total number of failures of a component 72 in a specified location on the board. In the example shown in FIG. 6, there are six of the same type of ASICs (Application Specific Integrated Circuits) in the middle of the board. Most of the failures are occurring on the ASIC in the center area of the board (as indicated by the longest bar). Once the location related failure is identified, failure modes can be investigated. In this example, most of the failure cases were solder ball crack issues. The area in the center of the board can then be highlighted as a mechanical weak point. The engineer can easily identify that the root cause of the issue is related to location. Based on the failure trend analysis, issues may be identified, for example, with a packaging design. The packaging design can then be changed and strain gauge testing may be performed to verify that the redesign has resolved the issue. An identified defective pin location may be used, for example, to guide selection of the strain gauge position in a drop test. Without the use of the embodiments described herein, much time may be wasted checking component quality and in root cause analysis.

Figure 8:
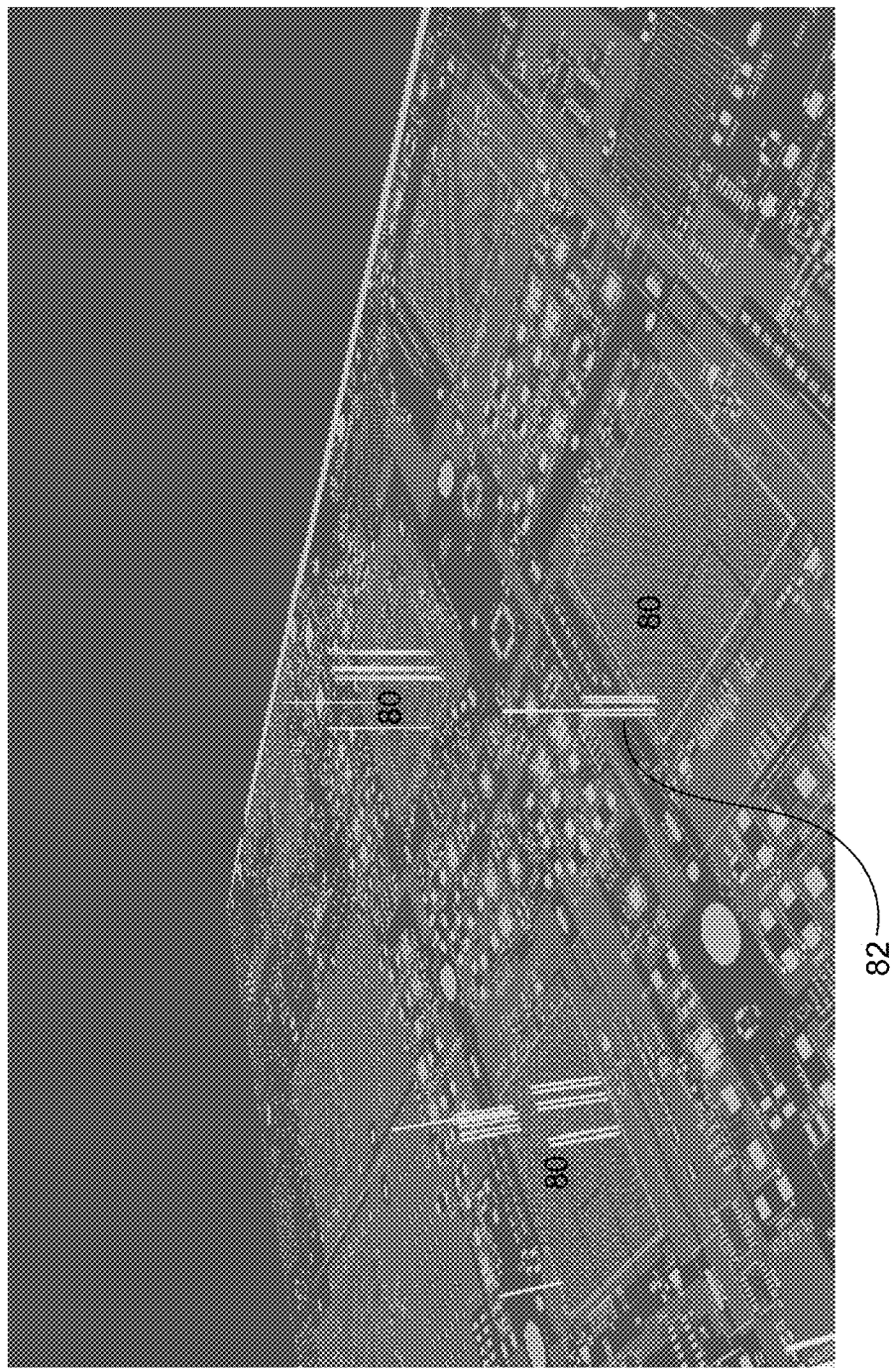
FIG. 8 is an example of a three dimensional image showing defective pin locations on chips of the circuit board.

FIG. 8 illustrates an example of a defective pin view in which detailed mechanical stress locations inside a specific chip 80 may be identified. For example, a BGA (Ball Grid Array) chip may have many pins and mechanical stress may occur on one side (edge) of the chip. The view shown in FIG. 8 allows a user to see solder ball crack failures. When the failure count 82 for the defective pins is mapped to the physical layout, a detailed view is provided of the mechanical stress damage locations.

The images shown in FIGS. 4, 5, 6A, 6B, 7, and 8 are black and white, however, any combination of colors may be used for the components, data bars, graphs, or any other parts of the image. For example, the bars may be pink and the electronic components blue so that the bars are easily distinguishable from the circuit board components.

The image displayed may include chips, subsystems, components, or any other assembly level. Visual indicators may also be used to identify an assembly that should be tested next. The overlay may include an indication of past repair data on one or more components or any other earlier testing or failure analysis details.

As noted above, instead of or in addition to output of the visual image, the system may generate an automatic alarm.

For example, if a number of failures in a certain location (e.g., within x distance, within a specified perimeter, near a specified connector, component, hole, or edge, etc.) exceed a defined threshold, the system may send a notification (e.g., via email, text, or other means) to one or more users.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a location related failure identification device, failure data for a plurality of components within a system;
   mapping at the location related failure identification device, said failure data to location data comprising a location of each of the components within the system;
   identifying at the location related failure identification device, location related failures based on said mapping; and
   outputting from the location related failure identification device, information on said location related failures.

2. The method of claim 1 wherein said information output from the location related failure identification device comprises an image comprising a layout of the components in the system and failures of the components identified on said layout.

3. The method of claim 2 wherein said image comprises a two dimensional or three dimensional view of a circuit board with electrical components and a bar graph overlay comprising said failure data.

4. The method of claim 2 wherein said image is configured for rotation and zoom.

5. The method of claim 2 wherein said image comprises a thermal overlay identifying operating temperatures at locations of the components.

6. The method of claim 1 wherein identifying said location related failures comprises automatically detecting that a number of failures within a specified location exceeds a defined threshold and said information comprises a notification.

7. The method of claim 1 wherein identifying said location related failures comprises automatically identifying a high risk location in the system.

8. The method of claim 1 wherein said failure data comprises failures identified during manufacturing testing of the system or system operation.

9. The method of claim 1 wherein outputting said location related failure information comprises outputting said information based on a filter generated according to user input parameters.

10. An apparatus comprising:
    a database comprising failure data for a plurality of components within a system and a location of each of the components within the system; and
    a processor when operating at the apparatus operable to map said failure data to the component locations, identify location related failures based on said mapping, and output information on said location related failures.

11. The apparatus of claim 10 wherein said information comprises an image comprising a layout of the components in the system and failures of the components identified on said layout.

12. The apparatus of claim 11 wherein said image comprises a thermal overlay identifying operating temperatures at locations of the components.

13. The apparatus of claim 10 wherein identifying said location related failures comprises automatically detecting that a number of failures within a specified location exceeds a defined threshold and said information comprises a notification.

14. The apparatus of claim 10 wherein identifying said location related failures comprises automatically identifying a high risk location in the system.

15. The apparatus of claim 10 wherein said failure data comprises failures identified during manufacturing testing of the system or system operation.

16. The apparatus of claim 10 wherein said information is output based on a filter generated according to user input parameters.

17. One or more non-transitory computer readable media comprising logic for execution by a processor and when executed operable to:
    process failure data for a plurality of components within a system;
    map said failure data to location data comprising a location of each of the components within the system;
    identify location related failures based on said mapping; and
    output information on said location related failures.

18. The one or more non-transitory computer readable media of claim 17 wherein said information comprises an image comprising a layout of the components in the system and failures of the components identified on said layout.

19. The one or more non-transitory computer readable media of claim 17 wherein identifying said location related failures comprises automatically identifying a high risk location in the system.

20. The one or more non-transitory computer readable media of claim 17 wherein said information comprises a thermal overlay identifying operating temperatures at locations of the components.

* * * * *

UNITED STATES PATENT AND TRADEMARK OFFICE
CERTIFICATE OF CORRECTION

PATENT NO. : 9,760,427 B2
APPLICATION NO. : 14/850670
DATED : September 12, 2017
INVENTOR(S) : Min Zhu and Jingming Li It is certified that error appears in the above-identified patent and that said Letters Patent is hereby corrected as shown below:

On the Title Page

Item (73)
Replace "(73) Assignees: Cisco Technology, Inc.; Cindy Kaplan"
With "(73) Assignee: Cisco Technology, Inc., San Jose, CA"

Signed and Sealed this
Twenty-fourth Day of April, 2018

Andrei Iancu
*Director of the United States Patent and Trademark Office*